United States Patent
Solihin

(10) Patent No.: US 9,047,194 B2
(45) Date of Patent: Jun. 2, 2015

(54) VIRTUAL CACHE DIRECTORY IN MULTI-PROCESSOR ARCHITECTURES

(75) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 152 days.

(21) Appl. No.: 13/818,485

(22) PCT Filed: Jul. 18, 2012

(86) PCT No.: PCT/US2012/047150
§ 371 (c)(1),
(2), (4) Date: Feb. 25, 2013

(87) PCT Pub. No.: WO2014/014452
PCT Pub. Date: Jan. 23, 2014

(65) Prior Publication Data
US 2014/0223104 A1     Aug. 7, 2014

(51) Int. Cl.
G06F 12/00     (2006.01)
G06F 12/08     (2006.01)

(52) U.S. Cl.
CPC ........ G06F 12/0808 (2013.01); G06F 12/0824 (2013.01); G06F 12/0837 (2013.01); G06F 2212/6042 (2013.01); G06F 2212/622 (2013.01); G06F 12/0817 (2013.01)

(58) Field of Classification Search
CPC .......................... G06F 12/0808; G06F 12/0817
USPC .......................................... 711/135, 118, 165
See application file for complete search history.

(56) References Cited

U.S. PATENT DOCUMENTS

| | | |
|---|---|---|
| 5,701,432 A | 12/1997 | Wong et al. |
| 6,079,008 A | 6/2000 | Clery, III |
| 7,802,073 B1 | 9/2010 | Cheng et al. |
| 7,805,577 B1 | 9/2010 | Mattina et al. |
| 2007/0006231 A1 | 1/2007 | Wang et al. |
| 2009/0303245 A1 | 12/2009 | Soupikov et al. |
| 2010/0318763 A1 | 12/2010 | Singh et al. |
| 2011/0131376 A1 | 6/2011 | Fischer |
| 2011/0153946 A1 | 6/2011 | Solihin |
| 2011/0161346 A1 | 6/2011 | Solihin |
| 2012/0137075 A1 | 5/2012 | Vorbach |

(Continued)

OTHER PUBLICATIONS

Ros, A. et al., Cache Coherence Protocols for Many—Core CMPs, Parallel and Distributed Computing, InTech (2010), 93-118.

(Continued)

*Primary Examiner* — Aracelis Ruiz
(74) *Attorney, Agent, or Firm* — Moritt Hock & Hamroff LLP; Steven S. Rubin, Esq.

(57) ABSTRACT

Technologies generally described herein relate to cache directories in multi-core processors. Various examples may include, methods, systems, and devices. A first tile may receive a request to transfer a thread from the first tile to a second tile. An instruction may be sent from the first tile to map a virtual cache identifier to identifiers of caches of the first and second tiles. The thread may be transferred from the first tile to the second tile. Thereafter, a request may be generated for a data block. After a determination that the data block is not stored in the second tile's cache, and that the virtual cache identifier is mapped to the first and second cache identifiers, a request may be sent for the data block to the first tile.

20 Claims, 5 Drawing Sheets

(56) References Cited

U.S. PATENT DOCUMENTS

2012/0173819 A1 7/2012 Solihin
2012/0246446 A1 9/2012 Solihin

OTHER PUBLICATIONS

Wentzlaff, D. et al., On-Chip Interconnection Architecture of the Tile Processor, IEEE Computer Society, 2007, 15-31.

Hirata, H. et al., An Elementary Processor Architecture with Simultaneous Instructions Issuing from Multiple Threads, Proceedings of the 19th Annual International Symposium on Computer Architecture, May 1992, 136-145.

P. Chaparro et al., Thermal aware clustered micro-architectures. In IEEE International Conference on Computer Design, Oct. 2004, pp. 48-53.

M.A. Suleman et al., "Accelerating Critical Section Execution with Asymmetric Multi Core Architectures", Proceedings of the 14th International Conference on Architectural Support for Programming Languages and Operating Systems (ASPLOS), pp. 253-264, Washington, DC, Mar. 2009.

M. Powell et al., "Architectural Core Salvaging for Hard Error Tolerance," ISCA 2009, 12 pages.

T. Li et al., "Operating System Support for Overlapping ISA Heterogeneous Multi Core Architectures", International Symposium on High Performance Computer Architecture, Jan. 2010, 12 pages.

T. Sondag and H. Rajan, "Phase Guided Thread to Core Assignment for Improved Utilization of Performance Asymmetric Multi Core Processors", Proc. of the 2009 ICSE Workshop on Multicore Software Engineering, 2009, 8 pages.

International Search Report and Written Opinion for application with application No. PCT/US12/47150, dated Dec. 18, 2012, 48 pages.

300 A computer program product.

302 A signal bearing medium.

304
At least one of
One or more instructions for a method for transferring a thread from a first tile to a second tile in a multi-core processor die; or
One or more instructions for receiving a first message at the first tile, wherein the first message corresponds to a request to transfer the thread from the first tile to the second tile, the first tile having a first cache, the second tile having a second cache; or
One or more instructions for in response to the first message, sending a second message from the first tile to a second tile, wherein the second message corresponds to an instruction to map a virtual cache identifier to a first cache identifier corresponding to the first cache, and to map the virtual cache identifier to a second cache identifier corresponding to the second cache; or
One or more instructions for after sending the second message, transferring the thread from the first tile to the second tile; or
One or more instructions for after transferring the thread, generating a third message at the second tile, wherein the third message corresponds to a request for a data block; or
One or more instructions for in response to the third message, determining that the data block is not stored in the second cache, and determining that the virtual cache identifier is mapped to the first cache identifier and to the second cache identifier; or
One or more instructions for in response to determining that the virtual cache identifier is mapped to the first cache identifier and to the second cache identifier, sending a fourth message from the second tile to the first tile, wherein the fourth message corresponds to a request for the data block; or
One or more instructions for in response to the fourth message, sending the data block from the first tile to the second tile.

| 306 A computer readable medium | 308 A recordable medium | 310 A communications medium |

Fig. 4

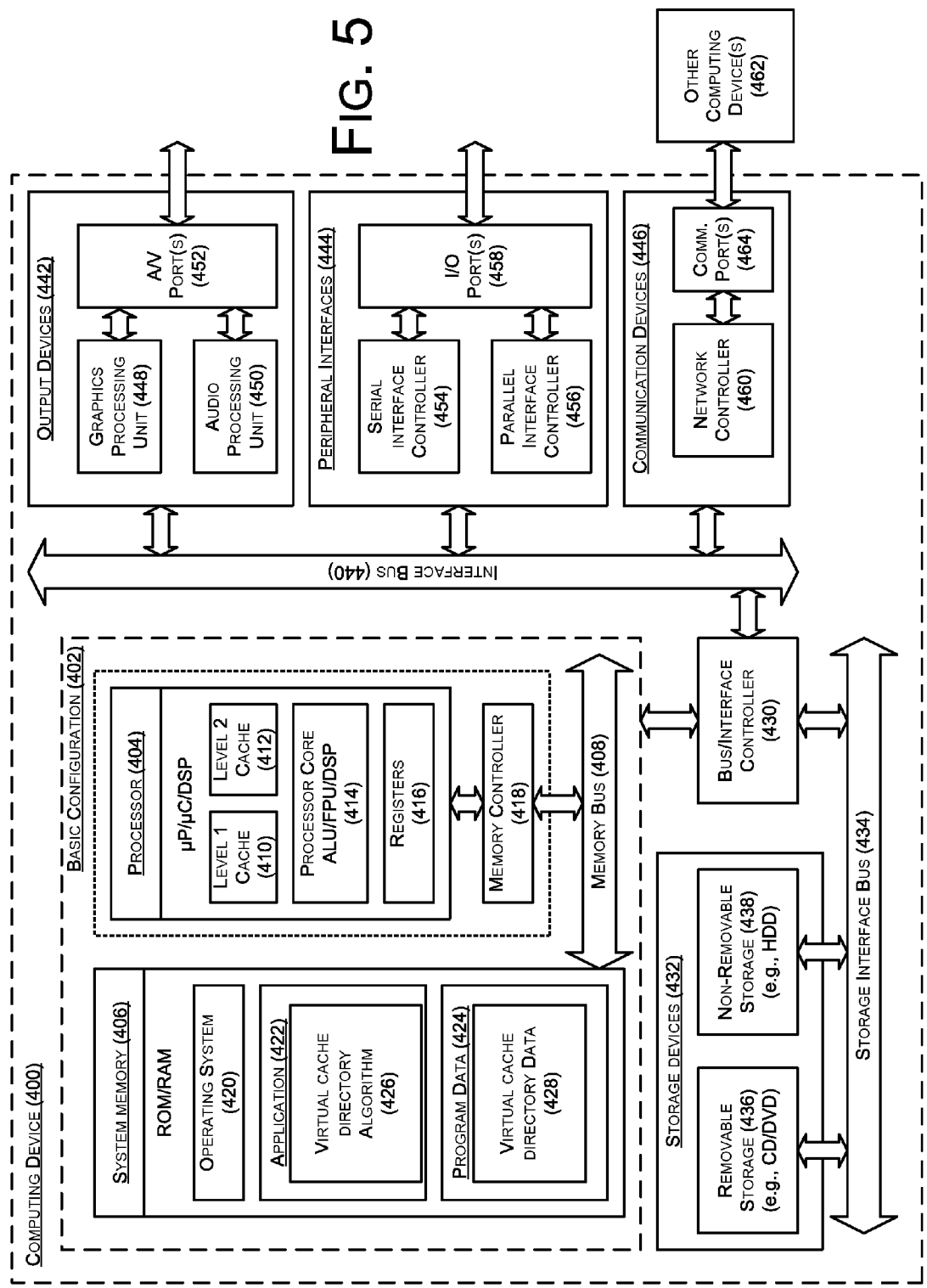

VIRTUAL CACHE DIRECTORY IN MULTI-PROCESSOR ARCHITECTURES

CROSS REFERENCE TO RELATED APPLICATION

This application is a U.S. National Stage Application filing under 35 U.S.C. §371 of International Application No. PCT/US2012/047150 filed Jul. 18, 2012, the entirety of which is hereby incorporated by reference.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor may be provided with a cache that stores data for the processor. As a single piece of data may be stored in multiple caches, a cache coherence protocol may be configured to keep track of the data stored in multiple caches. The cache coherence protocol may be configured to help ensure that multiple requests for data consistently result in the same data being returned.

SUMMARY

In some examples, a method for transferring a thread from a first tile to a second tile in a multi-core processor die is generally described. The method may include receiving a first message at the first tile. The first message may correspond to a request to transfer the thread from the first tile to the second tile. The first tile may have a first cache. The second tile may have a second cache. The method may further comprise, in response to the first message, sending a second message from the first tile to a second tile. The second message may correspond to an instruction to map a virtual cache identifier to a first cache identifier corresponding to the first cache, and to map the virtual cache identifier to a second cache identifier corresponding to the second cache. The method may further comprise, after sending the second message, transferring the thread from the first tile to the second tile. The method may further comprise, after transferring the thread, generating a third message at the second tile. The third message may correspond to a request for a data block. The method may further comprise, in response to the third message, determining that the data block is not stored in the second cache, and determining that the virtual cache identifier is mapped to the first cache identifier and to the second cache identifier. The method may further comprise, in response to determining that the virtual cache identifier is mapped to the first cache identifier and to the second cache identifier, sending a fourth message from the second tile to the first tile. The fourth message may correspond to a request for the data block. The method may further comprise, in response to the fourth message, sending the data block from the first tile to the second tile.

In some examples, a system effective to send a data block from a first tile in a multi-core processor die is generally described. The system may include a first tile. The first tile may include a first processor in communication with a first cache. The first processor may be effective to send a first message, from the first tile to a second tile in the die. The first message may correspond to an instruction to map a virtual cache identifier to a first cache identifier. The first cache identifier may correspond to the first cache. The first message may further correspond to an instruction to map the virtual cache identifier to a second cache identifier. The second cache identifier may correspond to a second cache in a second tile. The first processor may further be effective to transfer a thread from the first tile to the second tile. The first processor may further be effective to receive a request from the second tile for a data block. The first processor may further be effective to send the data block to the second tile.

In some examples, a method for requesting a data block from a first tile with a first cache by a second tile with a second cache in a multi-core processor die is generally described. The method may comprise receiving a first message from the first tile at the second tile. The first message may include an instruction to map a virtual cache identifier to a first cache identifier corresponding to the first cache, and to map the virtual cache identifier to a second cache identifier corresponding to the cache. The method may further include, after receiving the first message, receiving a thread at the second tile from the first tile. The method may further include, after receiving the thread, generating a second message at the second tile. The second message may correspond to a request for the data block. The method may further include in response to the second message, determining, at the second tile that the data block is not stored in the second cache and determining, at the second tile, that the virtual cache identifier is mapped to the first cache identifier and to the second cache identifier. The method may further include sending a third message from the second tile to the first tile. The third message may correspond to a request for the data block.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates a computer program product that can be utilized to implement a virtual cache directory in a multi-processor architecture; and FIG. 5 is a block diagram illustrating an example computing device that is arranged to implement a virtual cache directory in a multi-processor architecture; all arranged according to at least some embodiments described herein.

DETAILED DESCRIPTION

Figure 1:
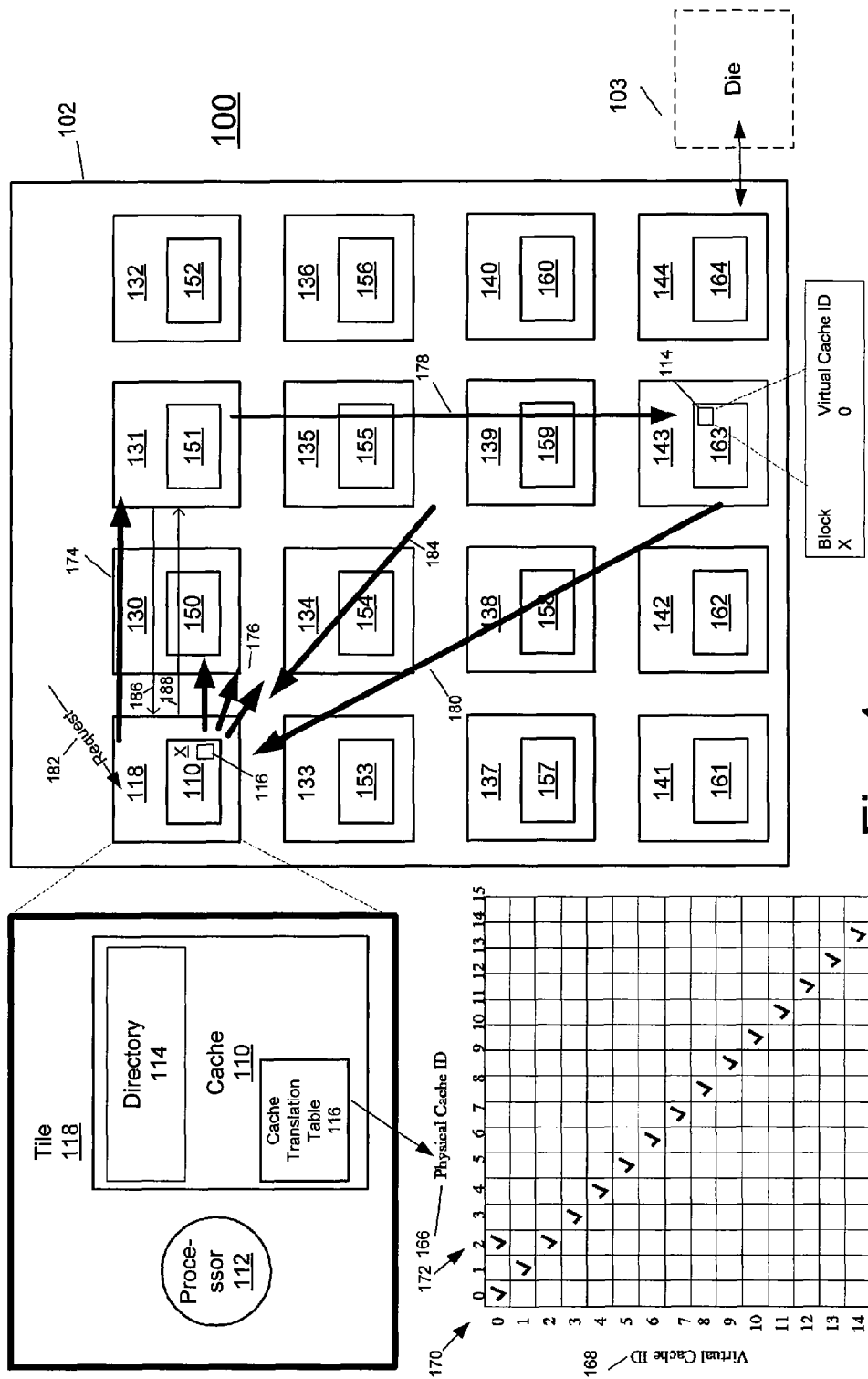
FIG. 1 illustrates an example system that can be utilized to implement a virtual cache directory in a multi-processor architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a virtual cache directory in multi-processor architectures.

Briefly stated technologies are generally described for cache directories in multi-core processors. Various examples may include, methods, systems, and devices. A first tile may receive a request to transfer a thread from the first tile to a second tile. An instruction may be sent from the first tile to map a virtual cache identifier to identifiers of caches of the first and second tiles. The thread may be transferred from the first tile to the second tile. Thereafter, a request may be generated for a data block. After a determination that the data block is not stored in the second tile's cache, and that the virtual cache identifier is mapped to the first and second cache identifiers, a request may be sent for the data block to the first tile.

FIG. 1 illustrates an example system that can be utilized to implement a virtual cache directory in multi-processor architectures arranged in accordance with at least some embodiments described herein. An example system 100 may include a die 102 including a plurality of tiles. Focusing on tile 118 for illustration, each tile 118 may include a cache 110, and a processor or processor core (hereinafter referred to as "processor") 112. Cache 110 may include data structures such as a directory 114, and/or a cache translation table 116. Processor 112 may be adapted to process data including code (hereinafter both data and code referred to as a "data block"). Cache 110 may be configured to store a data block local to processor 112.

As is described in more detail below, when processor 112 requests to access a data block, such as to write to or read from a data block that is stored in another tile, processor 112 may initially look in cache translation table 116. An example cache translation table may include a virtual table mapping virtual cache identifiers to physical tile identifiers. Processor 112 may be configured to search cache translation table 116 to determine if the tile requesting the block is mapped to the same virtual cache ID as another tile. If the requesting tile (e.g., a first tile) is mapped to the same virtual cache as another tile (e.g., a second tile), the requesting tile may send a request to the other tile which may result in quicker access to the data block.

Die 102 may include a matrix (e.g., array) of tiles 118, 130-144 including respective caches 110, 150-164. Each tile may also include one or more of a respective processor 112, and caches including data structures such as directory 114, and/or cache translation table 116. In some examples, each tile in die 102 may be substantially the same as in a homogenous arrangement, while in some other examples, some tiles may be different as in a heterogeneous arrangement. Die 102 may be arranged in communication with another die 103 so that data may be shared among a plurality of dies.

Directory 114 may be implemented as a data structure that identifies (e.g., indexes) a location associated with each data block that is stored in the tiles of die 102. Directory 114 may be located in a single tile on die 102 or distributed among many or all tiles. If directory 114 is distributed, for example, a first range of addresses (such as 0x0000-0x1000) may be stored in a first tile, while a second range of addresses (such as 0x1001-0x2000 or 0x0500-0x1500) may be stored in a second tile, etc. Directory 114 in the figure may illustrate a first portion of a directory for the entire die where that first portion may be stored in tile 118 and additional portions of the directory may be stored in other tiles such as tiles 130, 131, 132, etc.

Directory 114 may include a list of blocks stored in die 102, along with a state of the block and which caches may be sharing the block. In some examples, directory 114 may use a protocol such as MESI, MOESI, MSI, MOSI etc. In these types of protocols, directory 114 may be utilized to keep track of sharing states such as: modified (M) such as when a cache line has been modified since the line has been moved from a main memory; exclusive (E) such as when a cache line is only in one cache but the line matches a main memory; shared (S) such as when the cache line may be stored in other caches and the line matches the main memory; invalid (I) such as when the cache line is invalid; and/or owned (O) such as when the indicated cache line includes the most recent copy of the data.

Directory 114 may also be configured to store coherence information relating to virtual caches. In an example, a virtual cache may correspond to two physical caches. Data may be moved between these two physical caches and one corresponding virtual cache may be affected. In one example transfer, a thread may be moved from tile 118 to tile 131 without changing the directory information since virtual cache ID 0 does not change.

In some examples, cache translation table 116 may include a two dimensional table with physical cache ID columns 166 and virtual cache ID rows 168. As a default, indicators 170 may indicate that each virtual cache ID is mapped to one physical cache ID. For example, as shown, virtual cache ID 0 is mapped to physical cache ID 0. Similarly, virtual cache IDS 1-15 are each mapped to physical cache IDS 1-15 respectively. Physical cache IDS 0-15 could correspond to caches 110 and 150-164.

In an example, tile 118 may receive a message corresponding to a request to transfer 182 a thread being processed from tile 118 to tile 131. A transfer may include, for example, scheduling, sending, moving, assigning and/or migrating a thread. Such a request could occur, for example, to facilitate temperature control in die 102. In response to request 182, tile 118 may send a broadcast message 176 to tiles in die 102 instructing tiles in die 102 to update their respective cache translation tables 116.

Cache translation tables 116 may be updated as shown in FIG. 1. Cache ID 0 may correspond to tile 118 and cache ID 2 may correspond to tile 131. Cache translation table 116 may be updated to include an additional indication 172 to indicate that virtual cache ID 0 now maps to physical cache ID 0 (tile 118) and also to physical cache ID 2 (cache 131). When tile 118 receives an acknowledgement 184 from tiles in die 102 that the tiles have received message 176, tile 118 may then transfer the thread from tile 118 to tile 131 as show by arrow 174. Updating the cache translation tables 116 redefines what physical caches a virtual cache represents. This avoids the needs for cache coherence states or sharing information to be updated because from the point of view of the coherence protocol, both the state and sharing information of a data block have not changed.

After the transfer is complete, tile 131 may generate a message corresponding to a request for a data block such as a block X, which may result in a cache miss. In response to the cache miss, processor 112 in tile 131 may send a message to the directory 114, where the message corresponds to a request for block X. In the example, directory 114 may be in another tile 143. Processor 112 of tile 143 may receive the request, analyze directory 114, and determine that block X is mapped to virtual cache ID 0. Virtual cache ID 0, according to the cache translation table 116, may be mapped to physical cache IDs 0 (tile 118) and 2 (tile 131). Tile 143 may then send a message corresponding to a request to tile 118 to send data block X.

In another example where tile 131 experiences a cache miss, tile 131 may be configured to analyze cache translation table 116 in tile 131. Tile 131 may determine that both the cache in tile 131 and the cache in tile 118 are mapped to the same virtual cache (e.g., virtual cache 0). This determination of the mapping may indicate that a thread was recently transferred from tile 118 to tile 131 and thus tile 118 may have the requested block.

In response to this determination of mapping, processor 112 in tile 131 may send a message 186 to tile 118. Message 186 may correspond to a request for block X. Tile 118 may receive message 186. In response to message 186, tile 118 may send 188 block X to tile 131. In one example, tile 118 may thereafter invalidate its copy of block X. Tile 118 may invalidate block X by indicating in cache 110 that block X is now invalid. Tile 118 does not need to send information to directory 114 indicating that block X is now invalid, because directory 114 may record the state with the highest read or write privilege for virtual cache 0. For example, if tile 118 stores block X in "Invalid" state in cache 110, while tile 131 stores block X in "Shared" state in cache 151, the directory 114 records that block X is cached in virtual cache 0 in "Shared" state.

Subsequently, in an example, tile 131 may request to write to block X. Tile 131 may send a message to directory 114 in tile 143. The message may correspond to a request for permission to write to block X. Processor 112 in tile 143 may receive the request to write to block X. Tile 143 may then read cache translation table 116 and determine that virtual cache 0 may be mapped to physical cache 0 (tile 118) and mapped to physical cache 2 (tile 131). Tile 143 may then send an invalidation message 180 to tile 118. Invalidation message 180 may instruct tile 118 to invalidate block X in cache 110 of tile 118. Tile 118 may receive message 180 and may send data block X to tile 131 if tile 131 does not already have a valid copy of data block X. Tile 118 may mark block X as invalid in its cache 110. Tile 143 may then update a coherence status of block X in directory 114 as being "modified" or "exclusive/modified".

In another example, tile 140 may request to write to data block X. Tile 140 may send a request to directory 114 (in tile 143) to write to data block X. Directory 114 may indicate that block X is stored in virtual cache 0. Cache translation table 116 may indicate that virtual cache 0 is mapped to physical caches IDs 0 (tile 118) and cache ID 2 (tile 131). Tile 143 may then send requests to both tiles 118 and 131. The requests may request block X from tiles 118 and 131. Tile 143 may then send an invalidation message to both tiles 118 and 131 invalidating block X. Tile 143 may then update a status of block X in directory 114 as being "modified" or "exclusive/modified".

Transmission (or sending) of data block X may include a number of operations such as, for example, copying at least a part of the data block X, moving at least a part of the data block X, or some combination of copying or moving over time, etc. Moreover, read or write operations may include additional technical requirements for data communications such as asserting a read or write request line when address and/or data is available for communication over a bus, or by sending messages over an interconnection network, where the read/write operations may be either synchronous (e.g., clock based) or asynchronous (e.g., read/write acknowledge based).

Over time, as a thread may have moved from one tile to multiple other tiles, cache translation tables may grow in number of entries. Eventually each virtual cache may correspond to almost all physical caches. Cache translation tables may be cleaned using a variety of methods. For example, when a thread migrates from one cache to another, a timer may be added to the cache corresponding to the tile the thread ran on prior to migration. After the timer reaches a defined time out value, the sending tile may broadcast a message to tiles in the die. The message may include an instruction to the tiles to remove mapping of the sending cache to the virtual cache. Blocks in an original cache may be marked with a flag indicating their temporary nature. As blocks move from the original cache to a new cache where the thread migrates to, the flag for the blocks may be reset. Upon a time out, blocks in the cache with the set flag may be invalidated, and data may be written back if necessary. Alternatively, if the number of blocks with the set flag falls below a threshold value, the blocks in the cache may also be invalidated, and data may be written back if necessary.

Among other possible benefits, a system in accordance with the disclosure may provide easier, more efficient and faster thread transfer. Less protocol hops may be used. Moreover, as threads may be transferred to physically close tiles, less network hops may be used when transferring data blocks from the original tile to the new tile, resulting in a faster and more energy efficient data transfer. The cache coherence protocol need not be involved in the thread transfer, and the directory for the die need not be updated in thread transfer. The directory may keep track of data sharing by keeping track of information in virtual caches rather than physical caches, and hence no directory coherence information changes when data is transferred between two physical caches that a virtual cache maps to.

Figure 2:
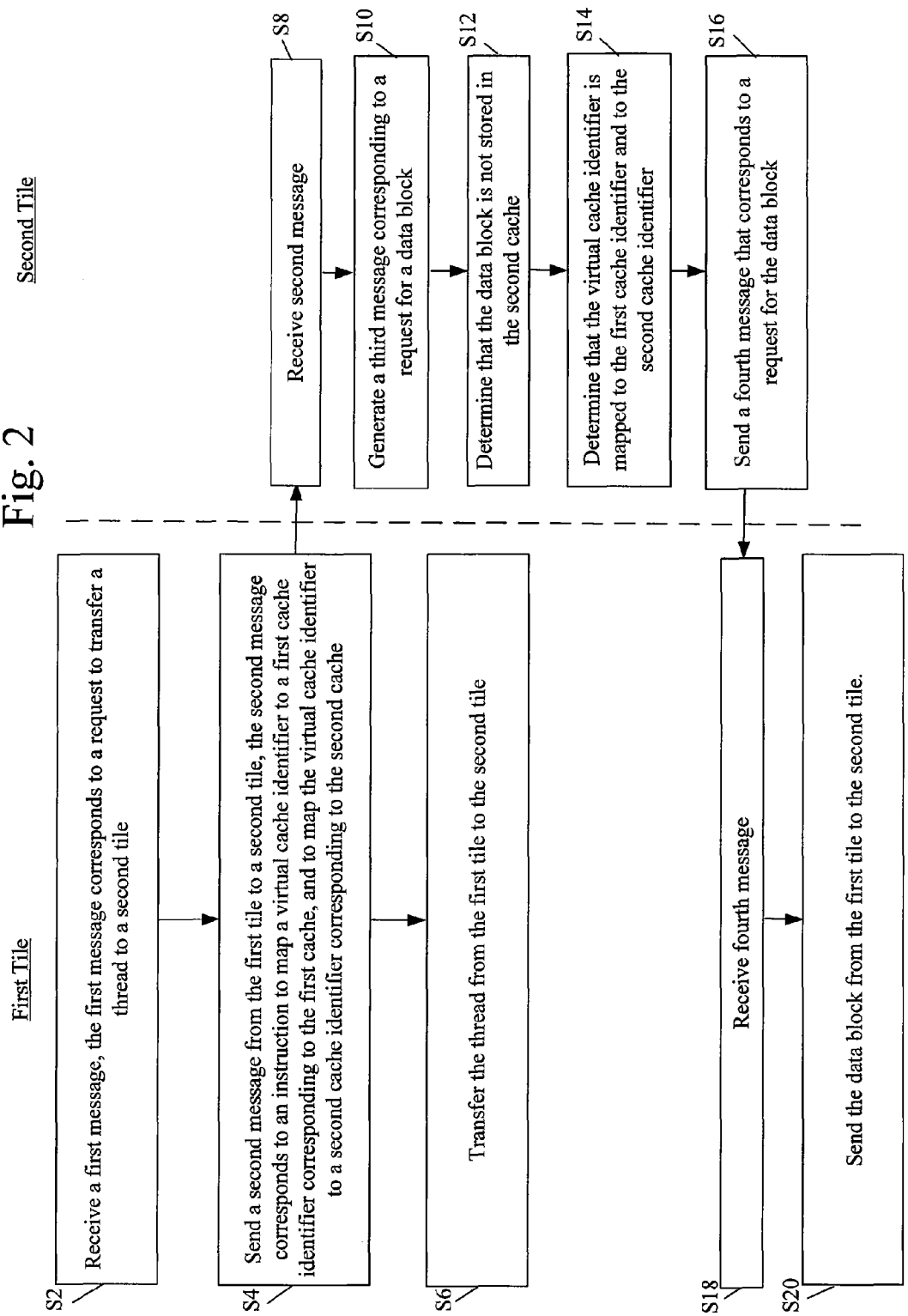
FIG. 2 depicts a flow diagram for an example process for implementing a virtual cache directory in a multi-processor architecture.

FIG. 2 depicts a flow diagram for an example process for implementing a virtual cache directory in a multi-processor architecture arranged in accordance with at least some embodiments described herein. In some examples, the process in FIG. 2 could be implemented using system 100 discussed above and may be used for transferring a thread from a first tile to a second tile in a multi-core processor die.

An example process may include one or more operations, actions, or functions as illustrated by one or more of blocks S2, S4, S6, S8, S10, S12, S14, S16, S18, and/or S20. Although illustrated as discrete blocks, various blocks may be divided into additional blocks, combined into fewer blocks, or eliminated, depending on the desired implementation. Blocks S2, S4, S6, S18 and S20 are depicted as operations, actions or functions that can be executed by a first tile in a die; while blocks S8, S10, S12, S14 and S16 are depicted as operations, actions or functions that can be executed by a second tile in a die.

Processing may begin at block S2, "Receive a first message, the first message corresponds to a request to transfer a thread to a second tile." A processor in the first tile may receive the first message, such as by a communication bus in the die, corresponding to a request to transfer a thread to a second tile. The first tile may include a first cache and the second tile may include a second cache.

Processing may continue from block S2 to block S4, "Send a second message from the first tile to a second tile, the second message corresponds to an instruction to map a virtual cache identifier to a first cache identifier corresponding to the first cache, and to map the virtual cache identifier to a second cache identifier corresponding to the second cache." The second message may also update cache translation tables in die 102. At block S4, a processor in the first tile may send a message, such as through the bus or the interconnect network, including an instruction to map a virtual cache identifier to the first cache identifier and the second cache identifier. This may allow for quicker cache coherence than if a directory were consulted during every transfer of a data block. Processing may continue from block S4 to block S8, "Receive second message". At block S8, the second tile may receive the second message through the bus.

Processing may also continue from block S4 to block S6, "Transfer the thread from the first tile to the second tile." At block S6, the thread may be transferred, such as by a communication bus, by moving, sending, assigning, migrating, etc.

Processing may continue from block S6 to block S10, "Generate a third message corresponding to a request for a data block." At block S10, the processor in the second tile may generate a request for a data block. Processing may continue from block S10 to block S12, "Determine that the data block is not stored in the second cache." At block S12, the second tile may analyze the second cache and determine that the data block is not stored in the second cache such as what may occur in a cache miss.

Processing may continue from block S12 to block S14, "Determine that the virtual cache identifier is mapped to the first cache identifier and to the second cache identifier." At block S14, the second tile may analyze a cache translation table and determine that the virtual cache identifier is mapped for the first and second cache identifier which may suggest that the block may be stored in the first tile.

Processing may continue from block S14 to block S16, "Send a fourth message that corresponds to a request for the data block." At block S16, the second tile may send a request over the bus or the interconnect network to the first tile for the data block. Processing may continue from block S16 to block S18, "Receive fourth message." At block S18, the first tile may receive the fourth message. Processing may continue from block S18 to block S20, "Send the data block from the first tile to the second tile." Blocks S10 through S20 may be repeated for different blocks that are transferred.

Figure 3:
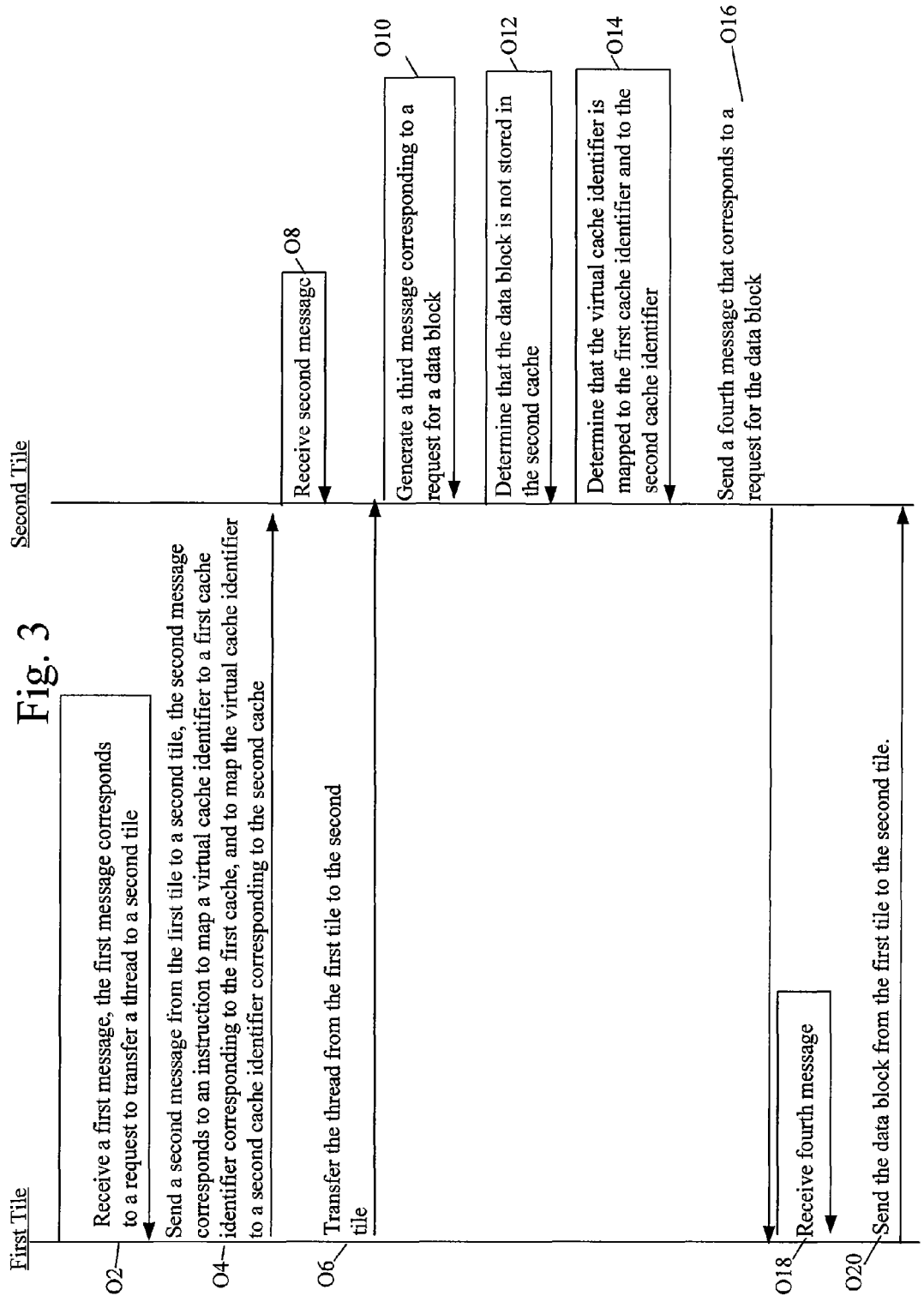
FIG. 3 depicts a signal flow diagram for an example process for implementing a virtual cache directory in a multi-processor architecture.

FIG. 3 depicts a signal flow diagram for an example process for implementing a virtual cache directory in a multi-processor architecture arranged in accordance with at least some embodiments described herein. In some examples, the process in FIG. 3 could be implemented using system 100 discussed above and may be used for transferring a thread from a first tile to a second tile in a multi-core processor die.

An example process may include one or more operations, actions, or functions as illustrated by one or more of operations O2, O4, O6, O8, O10, O12, O14, 016, O18, and/or O20. Operations O2, O4, O6, O18 and O20 are depicted as operations can be processed by the first tile; while operations O8, O10, O12, O14 and O16 are depicted as operations that can be processed by the second tile. Although illustrated as discrete operations, various operations may be divided into additional operations, combined into fewer operations, or eliminated, depending on the desired implementation.

Processing may begin at operation O2, "Receive a first message, the first message corresponds to a request to transfer a thread to a second tile." A processor in a first tile may receive the first message, such as by a communication bus in the die, corresponding to a request to transfer a thread to a second tile. The first tile may include a first cache and the second tile may include a second cache.

At operation O4, "Send a second message from the first tile to a second tile, the second message corresponds to an instruction to map a virtual cache identifier to a first cache identifier corresponding to the first cache, and to map the virtual cache identifier to a second cache identifier corresponding to the second cache." At operation O4, a processor in the first tile may send a message, such as through the bus or the interconnect network, including an instruction to map a virtual cache identifier to the first cache identifier and the second cache identifier. This message may update cache translation tables in tile 102. This may allow for quicker cache coherence than if a directory were consulted during every transfer of a data block. Processing may continue from operation O4 to operation O8, "Receive second message". At operation O8, the second tile may receive the second message through the bus.

Processing may also continue from operation O4 to operation O6, "Transfer the thread from the first tile to the second tile." At operation O6, the thread may be transferred, such as by a communication bus, by scheduling, moving, sending, assigning, migrating, etc.

Processing may continue from operation O6 to operation O10, "Generate a third message corresponding to a request for a data block." At operation O10, a processor in the second tile may generate a request for a data block. Processing may continue from operation O10 to operation O12, "Determine that the data block is not stored in the second cache." At operation O12, the second tile may analyze the second cache and determine that the data block is not stored in the second cache such as what may occur in a cache miss.

Processing may continue from operation O12 to operation O14, "Determine that the virtual cache identifier is mapped to the first cache identifier and to the second cache identifier." At operation O14, the second tile may analyze a cache translation table and determine that the virtual cache identifier is mapped for the first and second cache identifier which may suggest that the block may be stored in the first tile.

Processing may continue from operation O14 to operation O16, "Send a fourth message that corresponds to a request for the data block." At operation O16, the second tile may send a request over the bus to the first tile for the data block. Processing may continue from operation O16 to operation O18, "Receive fourth message." At operation O18, the first tile may receive the fourth message. Processing may continue from operation O18 to operation O20, "Send the data block from the first tile to the second tile." Operations O10 through O20 may be repeated for different blocks that are transferred.

FIG. 4 illustrates an example computer program product 300 that can be utilized to implement a virtual cache directory in a multi-processor architecture arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, one or more of processors 112 in tiles 118, 130-144 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 5 is a block diagram illustrating an example computing device 400 that is arranged to implement a virtual cache directory in a multi-processor architecture arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a virtual cache directory algorithm 426 that is arranged to perform the functions as described herein including those described with respect to system 100 of FIG. 1. Program data 424 may include virtual cache directory data 428 that may be useful to implement a virtual cache directory in multi-processor architectures as is described herein. In some embodiments, application 422 may be arranged to operate with program data 424 on operating system 420 such that a virtual cache directory in multi-processor architectures may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to transfer a thread from a first tile to a second tile in a multi-core processor die, the method comprising:
   receiving a first message at the first tile, wherein the first message corresponds to a request to transfer the thread from the first tile to the second tile, the first tile having a first cache, the second tile having a second cache;
   in response to the first message, sending a second message from the first tile to a second tile, wherein the second message corresponds to an instruction to map a virtual cache identifier to a first cache identifier corresponding to the first cache, and to map the virtual cache identifier to a second cache identifier corresponding to the second cache, wherein, in response to the instruction, the virtual cache identifier is mapped to the first and second cache identifiers;
   after sending the second message, transferring the thread from the first tile to the second tile;
   after transferring the thread, generating a third message at the second tile, wherein the third message corresponds to a first request for a data block to be sent to the second tile;
   in response to the third message, determining that the data block is not stored in the second cache;
   in response to the third message, determining that the virtual cache identifier is mapped to the first cache identifier and to the second cache identifier;
   in response to determining that the virtual cache identifier is mapped to the first cache identifier and the virtual cache identifier is mapped to the second cache identifier, sending a fourth message from the second tile to the first tile, wherein the fourth message corresponds to a second request for the data block to be sent to the second tile; and in response to the fourth message, sending the data block from the first tile to the second tile.

2. The method as recited in claim 1, further comprising:
receiving the second message by a third tile, the third tile including a directory for the die;
sending a fifth message from the second tile to the third tile, the fifth message corresponding to a request to write to the data block;
receiving the fifth message at the third tile;
after receiving the fifth message at the third tile, determining, at the third tile, that the virtual cache identifier is mapped to the first cache identifier and to the second cache identifier and sending a sixth message, by the third tile to the first tile, wherein the sixth message corresponds to an instruction to invalidate the data block in the first cache; and
after sending the sixth message, updating the directory by the third tile to indicate that a status of the data block is modified.

3. The method as recited in claim 1, further comprising, after sending the second message, receiving an acknowledgement at the first tile that at least the second tile in the die received the second message.

4. The method as recited in claim 1, further comprising, after sending the data block, invalidating, by the first tile, the data block in the first cache.

5. The method as recited in claim 1, further comprising, after sending the data block:
invalidating, by the first tile, the data block in the first cache; and
after sending the second message, receiving an acknowledgement at the first tile that at least the second tile in the die received the second message.

6. The method as recited in claim 1, further comprising:
receiving the second message by a third tile, the third tile including a directory for the die;
sending a fifth message from the second tile to the third tile, the fifth message corresponding to a request to write to the data block;
receiving the fifth message at the third tile;
in response to the fifth message, determining, at the third tile, that the virtual cache identifier is mapped to the first cache identifier and to the second cache identifier;
in response to determining that the virtual cache identifier is mapped to the first cache identifier and to the second cache identifier, sending a sixth message by the third tile to the first tile, the sixth message corresponding to an instruction to invalidate the data block in the first cache;
after sending the sixth message, updating the directory by the third tile to indicate that a status of the data block is modified; and
after sending the sixth message, invalidating, by the first tile, the data block in the first cache.

7. The method as recited in claim 1, further comprising:
receiving the second message by a third tile, the third tile including a directory for the die;
sending a fifth message to the third tile from a fourth tile, the fifth message corresponding to a request to write to the data block;
receiving the fifth message at the third tile;
in response to the fifth message, determining, by the third tile, that the data block is mapped to the virtual cache identifier and determining, at the third tile, that the virtual cache identifier is mapped to the first cache identifier and to the second cache identifier;
after determining that the virtual cache identifier is mapped to the first cache identifier and to the second cache identifier, sending, by the third tile, a sixth message to the first tile, wherein the sixth message corresponds to a request to send the data block to the fourth tile;
after determining that the virtual cache identifier is mapped to the first cache identifier and to the second cache identifier, sending, by the third tile, a seventh message to the second tile, wherein the seventh message corresponds to a request to send the data block to the fourth tile;
after sending the sixth message, sending, by the third tile, an eighth message to the first tile, wherein the eighth message corresponds to an instruction to invalidate the data block in the first cache;
after sending the seventh message, sending, by the third tile, a ninth message to the second tile, wherein the ninth message corresponds to an instruction to invalidate the data block in the second cache; and
after sending the sixth and seventh messages, updating the directory by the third tile to indicate that a status of the data block is modified.

8. The method as recited in claim 1, further comprising:
adding a timer to the first cache after transferring the thread from the first tile to the second tile; and
a period of time after adding the timer, sending, by the first tile, a fifth message to at least the second tile, wherein the fifth message includes an instruction to remove the map of the virtual cache identifier to the first cache identifier.

9. The method as recited in claim 1, wherein the data block is a particular data block and the method further comprises:
marking at least some data blocks with a flag in the first tile;
after sending the particular data block from the first tile to the second tile, removing a particular flag corresponding to the particular data block;
counting a number of data blocks with the flag;
determining whether the number of data blocks with the flag is below a threshold value; and
after determining that the number of data blocks with the flag is below the threshold value, invalidating and/or writing back data blocks in the first tile that have the flag.

10. A system effective to send a data block from a first tile in a multi-core processor die, the system comprising:
the first tile, the first tile includes a first processor in communication with a first cache;
the first processor effective to:
send a first message, from the first tile to a second tile in the die, wherein the first message corresponds to:
an instruction to map a virtual cache identifier to a first cache identifier, wherein the first cache identifier corresponds to the first cache, and
an instruction to map the virtual cache identifier to a second cache identifier, wherein the second cache identifier corresponds to a second cache in a second tile;
transfer a thread from the first tile to the second tile;
receive a request from the second tile for a data block to be sent to the second tile; and
send the data block from the first tile to the second tile.

11. The system as recited in claim 10, wherein the first processor is further effective to receive a second message from a third tile, wherein the second message corresponds to an instruction to invalidate the data block in the first cache, and wherein the third tile includes a directory for the die.

12. The system as recited in claim 10, wherein the first processor is further effective to receive a second message from the second tile, the second message corresponds to an acknowledgement that the second tile received the first message.

13. The system as recited in claim 10, wherein the first processor is further effective to invalidate the data block in the first cache.

14. The system as recited in claim 10, wherein the first processor is further effective to:
  invalidate the data block in the first cache; and
  send a second message to a third tile, wherein the second message corresponds to an instruction that the data block is invalid in the first cache, and wherein the third tile includes a directory for the die.

15. The system as recited in claim 10, wherein the first processor is further effective to:
  add a time stamp to the first cache after the thread is sent from the first tile to the second tile; and
  after a period of time, send a second message to at least the second tile, wherein the second message corresponds to an instruction to remove the map of the virtual cache identifier to the first cache identifier.

16. The system as recited in claim 10, wherein the data block is a particular data block and the first processor is further effective to:
  mark the particular data block with a particular flag;
  mark at least some other data blocks in the first tile with other flags;
  after the particular data block is sent from the first tile to the second tile, remove the particular flag; and
  invalidate at least one of the other data blocks in the first tile that includes at least one of the other flags.

17. A method to request a data block from a first tile with a first cache by a second tile with a second cache in a multi-core processor die, the method comprising:
  receiving a first message from the first tile at the second tile, the first message including an instruction to map a virtual cache identifier to a first cache identifier corresponding to the first cache, and to map the virtual cache identifier to a second cache identifier corresponding to the cache;
  mapping the virtual cache identifier to the first cache identifier;
  mapping the virtual cache identifier to the second cache identifier;
  after receiving the first message, receiving a thread at the second tile from the first tile;
  after receiving the thread, generating a second message at the second tile, the second message corresponding to a first request for the data block to be sent to the second tile;
  in response to the second message, determining, at the second tile that the data block is not stored in the second cache;
  in response to the second message, determining, at the second tile, that the virtual cache identifier is mapped to the first cache identifier;
  in response to the second message, determining, at the second tile, that the virtual cache identifier is mapped to the second cache identifier; and
  sending a third message from the second tile to the first tile, wherein the third message corresponds to a second request for the data block to be sent to the second tile.

18. The method as recited in claim 17, further comprising:
  receiving the first message by a third tile, the third tile including a directory for the die;
  sending a fourth message from the second tile to the third tile, wherein the fourth message corresponds to a request to write to the data block;
  receiving the fourth message by the third tile after receiving the first message;
  after receiving the fourth message at the third tile, determining, at the third tile, that the virtual cache identifier is mapped to the first cache identifier and to the second cache identifier; and
  sending, by the third tile to the first tile, a sixth message, wherein the sixth message corresponds to an instruction to invalidate the data block in the first tile.

19. The method as recited in claim 17, further comprising:
  receiving the first message by a third tile, the third tile including a directory for the die;
  sending a fourth message from the second tile to the third tile, wherein the fourth message corresponds to a request to write to the data block;
  receiving the fourth message by the third tile after receiving the first message;
  after receiving the fourth message at the third tile, determining, at the third tile, that the virtual cache identifier is mapped to the first cache identifier and to the second cache identifier, and sending, by the third tile to the first tile, a fifth message, wherein the fifth message corresponds to an instruction to invalidate the data block in the first tile; and
  after sending the fifth message, updating the directory to indicate that a status of the data block is modified.

20. The method as recited in claim 17, further comprising:
  receiving the first message by a third tile, the third tile including a directory for the die;
  sending a fourth message from a fourth tile to the third tile, wherein the fourth message corresponds to a request to write to the data block;
  receiving the fourth message at the third tile after receiving the first message;
  after receiving the fourth message at the third tile, determining, by the third tile, that the data block is mapped to the virtual cache identifier;
  determining, at the third tile, that the virtual cache identifier is mapped to the first cache identifier and to the second cache identifier;
  after determining that the virtual cache identifier is mapped to the first cache identifier and to the second cache identifier, sending, by the third tile, a fifth message to the first tile, wherein the fifth message corresponds to an instruction to send the data block to the fourth tile;
  after determining that the virtual cache identifier is mapped to the first cache identifier and to the second cache identifier, sending, by the third tile, a sixth message to the second tile, wherein the sixth message corresponds to a request to send the data block to the fourth tile;
  after sending the fifth message, sending, by the third tile, a seventh message to the first tile, the seventh message corresponds to an instruction to invalidate the data block in the first cache; and
  after sending the sixth message, sending, by the third tile, an eighth message to the second tile, wherein the eighth message corresponds to an instruction to invalidate the data block in the second cache.

* * * * *

UNITED STATES PATENT AND TRADEMARK OFFICE
CERTIFICATE OF CORRECTION

| | | |
|---|---|---|
| PATENT NO. | : 9,047,194 B2 | Page 1 of 1 |
| APPLICATION NO. | : 13/818485 | |
| DATED | : June 2, 2015 | |
| INVENTOR(S) | : Solihin | |

It is certified that error appears in the above-identified patent and that said Letters Patent is hereby corrected as shown below:

In the drawings:

In Fig. 4, Sheet 4 of 5, for Tag "304", in Line 13, delete "identificr" and insert -- identifier --, therefor.

In the specification:

In Column 1, Line 8, delete "35 U.S.C. §371" and insert -- 35 U.S.C. § 371 --, therefor.

In Column 4, Line 30, delete "owned (0)" and insert -- owned (O) --, therefor.

Signed and Sealed this
Nineteenth Day of January, 2016

Michelle K. Lee
*Director of the United States Patent and Trademark Office*